United States Patent
Hawley et al.

(10) Patent No.: US 8,091,068 B2
(45) Date of Patent: Jan. 3, 2012

(54) USER CONFIGURABLE LANGUAGE INDEPENDENT CODE ASSIST METHOD, SYSTEM, ARTICLE OF MANUFACTURE, AND COMPUTER PROGRAM PRODUCT

(75) Inventors: Allen K. Hawley, Morgan Hill, CA (US); Pavan K. Immaneni, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 11/956,090

(22) Filed: Dec. 13, 2007

(65) Prior Publication Data

US 2008/0098352 A1 Apr. 24, 2008

Related U.S. Application Data

(63) Continuation of application No. 10/732,325, filed on Dec. 9, 2003, now Pat. No. 7,373,634.

(51) Int. Cl.
*G06F 9/44* (2006.01)
(52) U.S. Cl. .......................... 717/110; 717/106; 717/109
(58) Field of Classification Search .................. 717/106, 717/109, 110
See application file for complete search history.

(56) References Cited

U.S. PATENT DOCUMENTS

| | | | |
|---|---|---|---|
| 6,026,233 | A | 2/2000 | Shulman et al. |
| 6,237,136 | B1 | 5/2001 | Sadahiro |
| 6,269,475 | B1 | 7/2001 | Farrell et al. |
| 6,305,008 | B1 * | 10/2001 | Vaidyanathan et al. ...... 717/111 |
| 6,311,323 | B1 | 10/2001 | Shulman et al. |
| 6,314,559 | B1 * | 11/2001 | Sollich .......................... 717/111 |
| 6,337,693 | B1 | 1/2002 | Roy et al. |
| 6,502,233 | B1 | 12/2002 | Vaidyanathan et al. |
| 6,965,990 | B2 | 11/2005 | Barsness et al. |
| 7,322,023 | B2 | 1/2008 | Shulman et al. |
| 7,779,356 | B2 * | 8/2010 | Griesmer ...................... 715/711 |
| 2002/0016953 | A1 | 2/2002 | Sollich |
| 2002/0095657 | A1 | 7/2002 | Vaidyanathan et al. |
| 2003/0200528 | A1 | 10/2003 | Li |
| 2004/0153995 | A1 | 8/2004 | Polonovski |
| 2005/0015747 | A1 | 1/2005 | Zatloukal et al. |

(Continued)

OTHER PUBLICATIONS

Ying et al., "Using Version Information for Concern Inference and Code-Assist", 2002.*

(Continued)

*Primary Examiner* — Wei Zhen
*Assistant Examiner* — Phillip Nguyen
(74) *Attorney, Agent, or Firm* — Rabindranath Dutta; Konrad Raynes & Victor LLP

(57) ABSTRACT

A code assist function which suggests candidates responsive to a parsing of a partial program instruction statement by determining a current cursor position in the partial program instruction statement; parsing the partial program instruction statement before the current cursor position; generating a list of candidates to be inserted at the current cursor position responsive to the parsing of the partial program instruction statement; applying a user-selected preference to the list of candidates to generate a suggested list of candidates; displaying the list of suggested candidates; allowing a user to select one of the list of suggested candidates; and inserting at the current cursor position the user-selected suggested candidate. User-selectable preferences may be selected such as a longer or shorter list of candidates; a longer or shorter representation keyword candidates; a full syntax or partial syntax representation of a candidate; and a character case representation of a candidate.

6 Claims, 10 Drawing Sheets

U.S. PATENT DOCUMENTS

2005/0125766 A1 6/2005 Hawley et al.
2005/0125767 A1 6/2005 Hawley et al.
2005/0125773 A1 6/2005 Hawley et al.

OTHER PUBLICATIONS

Storey et al., "Improving the Usability of Eclipse for Novice Programmers", 2003.*

Little, G. and R.C. Miller, "Code Completion using Keyword Queries in Java", 2005, Total 13 pp.

Office Action 1, Sep. 5, 2006, for U.S. Appl. No. 10/732,325, Total 20 pp.

Amendment 1, Dec. 5, 2006, for U.S. Appl. No. 10/732,325, Total 13 pp.

Final Office Action 1, Mar. 7, 2007, for U.S. Appl. No. 10/732,325, Total 18 pp.

Amendment 2, Jun. 7, 2007, for U.S. Appl. No. 10/732,325, Total 12 pp.

Notice of Allowance 1, Sep. 12, 2007, for U.S. Appl. No. 10/732,325, Total 11 pp.

Office Action 1, Apr. 12, 2011, for U.S. Appl. No. 11/932,768, Total 20 pp.

Office Action 1, Sep. 18, 2006, for U.S. Appl. No. 10/731,963, Total 21 pp.

Amendment 1, Dec. 18, 2006, for U.S. Appl. No. 10/731,963, Total 13 pp.

Final Office Action 1, Mar. 13, 2007, for U.S. Appl. No. 10/731,963, Total 18 pp.

Amendment 2, Jun. 13, 2007, for U.S. Appl. No. 10/731,963, Total 14 pp.

Notice of Allowance 1, Aug. 14, 2007, for U.S. Appl. No. 10/731/963, Total 12 pp.

Office Action 1, Feb. 8, 2007, for U.S. Appl. No. 10/731,970, Total 15 pp.

Amendment 1, May 8, 2007, for U.S. Appl. No. 10/731,970, Total 9 pp.

Final Office Action 1, Aug. 10, 2007, for U.S. Appl. No. 10/731,970, Total 11 pp.

Amendment 2, Nov. 13, 2007, for U.S. Appl. No. 10/731,970, Total 10 pp.

Office Action 3, Feb. 19, 2008, for U.S. Appl. No. 10/731,970, Total 16 pp.

Amendment 3, May 19, 2008, for U.S. Appl. No. 10/731,970, Total 11 pp.

Final Office Action 2, Sep. 3, 2008, for U.S. Appl. No. 10/731,970, Total 16 pp.

Pre-Appeal Brief Request for Review, Dec. 3, 2008, for U.S. Appl. No. 10/731,970, Total 5 pp.

Notice of Panel Decision from Pre-Appeal Brief Review, Dec. 19, 2008, for U.S. Appl. No. 10/731,970, Total 3 pp.

Notice of Allowance 1, Mar. 13, 2009, for U.S. Appl. No. 10/731,970, Total 21 pp.

Stubenschrott, M., "A Context Sensitive code Completion System for the C and C++ Programming Languages", Apr. 2005, Total 26 pp.

IBM Corporation, "Eclipse Project Java Development User Guide", 2000-2001, 55 pp.

U.S. Appl. No. 11/932,768, filed on Oct. 31, 2007, entitled "User Configurable Language Independent Code Assist Method, System, Article of Manufacture, and Computer Program Product", invented by A.K. Hawley and P.K. Immaneni, 41 pp.

Amendment 1, Jul. 12, 2011, for U.S. Appl. No. 11/932,768, Total 10 pp.

* cited by examiner

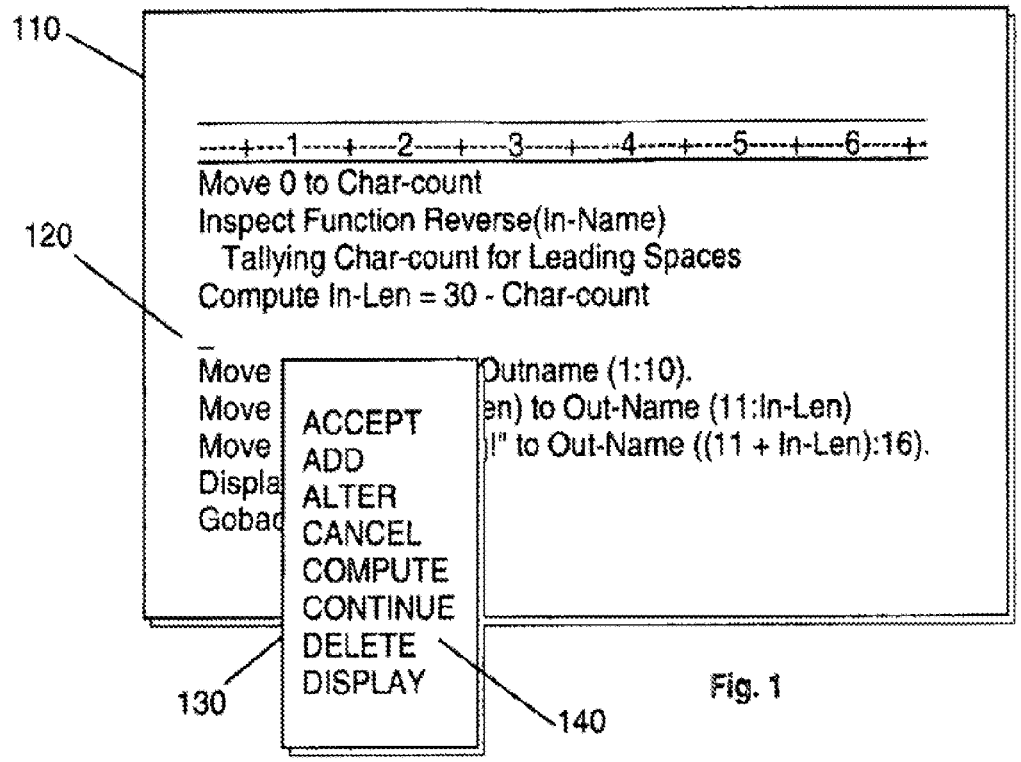

USER CONFIGURABLE LANGUAGE INDEPENDENT CODE ASSIST METHOD, SYSTEM, ARTICLE OF MANUFACTURE, AND COMPUTER PROGRAM PRODUCT

CROSS-REFERENCE TO RELATED APPLICATIONS

This application is a continuation of application Ser. No. 10/732,325 filed on Dec. 9, 2003, which is incorporated herein by reference in its entirety.

Application Ser. No. 10/731,970, filed concurrently with application Ser. No. 10/732,325 on Dec. 9, 2003 for USER CONFIGURABLE LANGUAGE INDEPENDENT CODE ASSIST ENGINE METHOD, SYSTEM, ARTICLE OF MANUFACTURE, AND COMPUTER PROGRAM PRODUCT currently co-pending, and assigned to the same assignee as the present invention; and Application Ser. No. 10/731,963 filed concurrently with application Ser. No. 10/732,325 on Dec. 9, 2003 for LANGUAGE INDEPENDENT CODE ASSIST USER PREFERENCES CONFIGURATION METHOD, SYSTEM, ARTICLE OF MANUFACTURE, AND COMPUTER PROGRAM PRODUCT, currently co-pending, and assigned to the same assignee as the present invention.

The foregoing co-pending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to computer programs, and more particularly to providing assistance to a programmer creating computer program code.

2. Description of the Related Art

A code assist or content assist is a function which aids a programmer in writing a computer program statement by suggesting proposals or candidates for insertion into the computer program statement. The programmer may select one of the proposals or candidates in order to supplement, modify, complete, or replace a computer program statement being edited.

Conventional code assist functions are exemplified by the Eclipse Project code assist function as described in the Eclipse Project Java Development User Guide, (c) Copyright IBM Corp. 2000, 2001, pages 9-12, http://www.eclipse.org/eclipse/index.html. The Eclipse Project code assist function provides a programmer with suggested assistance in writing Java code. The programmer may activate the Eclipse Project code assist function from a Java code editor on a line of Java computer program code which causes a scrollable list of available Java code completions to be displayed. The programmer may then select one of the proposed Java code completion candidates from the scrollable list to be inserted to complete the line of Java computer program code.

The programmer may also configure the behavior of the Eclipse Project code assist by selecting or specifying various preferences in a Code Assist tab within a Java Editor preference page. Color preferences allow the programmer to specify the colors used for the code assist window and the colors used when showing method parameters. An alphabetical sort preference, if enabled, causes proposals to be sorted in alphabetical order. A visibility preference limits displayed proposals in the list by Java visibility rules to only those proposals visible in a current invocation context. An argument name preference, if enabled, causes a selection of a Java method proposal to additionally insert the Java method's argument names as specified in the Java method's declaration. A qualified versus import name preference allows the programmer to select whether the code assist function inserts fully qualified names for type proposals or inserts non-qualified names for type proposals in conjunction with an addition of the corresponding import declaration. A preference for automatic insertion of a single proposal when the proposal list only contains the single proposal may be specified. The user may also specify preferences as to the code assist function's activation behavior. An auto activation preference may specify that code assist is invoked automatically in response to specified character triggers after a specified time delay.

Even with these capabilities and user-specified preferences, conventional code assist functions still fail to provide adequate assistance for a programming language which allows a variation in valid syntax for a particular command or verb, a variation in keyword representations for a particular keyword, variations in valid argument types for a particular command or verb, or variations in style such as character case. In view of these possible variations, a user may prefer only one of the variations, or the user may prefer to be reminded of all of the possible variations.

In particular, these conventional code assist functions fail to provide adequate assistance for variable-syntax programming languages such as COBOL or PL/I having these complexities. Complex languages such as COBOL may have numerous variations in syntax for a single statement. For example, a COBOL TOGO statement has the syntax: "GO" ["TO"] procedure-name, which gives rise to two format variations: "GO TO procedure name" and "GO procedure-name". The COBOL MOVE statement has the following syntax:
  "MOVE" [CORRESPONDING|CORR] {identifier-1|literal-1} "TO" identifier-2
and has six format variations:
  "MOVE CORRESPONDING identifier-1 TO identifier-2"
  "MOVE CORRESPONDING literal-1 TO identifier-2"
  "MOVE CORR identifier-1 TO identifier-2"
  "MOVE CORR literal-1 TO identifier-2"
  "MOVE identifier-1 TO identifier-2"
  "MOVE literal-1 TO identifier-2"
In a complex language such as COBOL, keywords may have alternative spellings. For example, COBOL keywords may have the following alternative spellings: "CORRESPONDING" or "CORR", "IDENTIFICATION" or "ID", "JUSTIFIED" or "JUST", "PICTURE" or "PIC", "SYNCHRONIZED" or "SYNC", and "THROUGH" or "THRU". Alternatively, keywords or reserve words may be optional, such as the optional keyword "TO" in the above GOTO statement or the optional keyword CORRESPONDING in the above MOVE statement. Further complexities may result from keywords dictating a subsequent format of a statement, or from a format being recursive.

A programmer desiring an effective code assist function for such a complex programming language needs a code assist function which supports such complexity variations, supports user-specified preferences for such complexity variations, and which effectively provides suggested proposals for completing programming statements having such complexity variations. However, conventional code assist functions fail to provide this. Thus, there is a clearly felt need for an improved code assist function for such complex language variations.

SUMMARY OF THE INVENTION

Preferred embodiments of the present invention comprise a method, system, article of manufacture, and computer program product for providing code assist.

In accordance with a preferred embodiment of the present invention, a code assist function which suggests candidates responsive to a parsing of a partial program instruction statement by determining a current cursor position in the partial program instruction statement; parsing the partial program instruction statement before the current cursor position; generating a list of candidates to be inserted at the current cursor position responsive to the parsing of the partial program instruction statement; applying a user-selected preference to the list of candidates to generate a suggested list of candidates; displaying the list of suggested candidates; allowing a user to select one of the list of suggested candidates; and inserting at the current cursor position the user-selected suggested candidate. User-selectable preferences may be selected such as a longer or shorter list of candidates; a longer or shorter representation keyword candidates; a full syntax or partial syntax representation of a candidate; and a character case representation of a candidate.

A preferred embodiment of the present invention has the advantage of providing an improved code assist function.

A preferred embodiment of the present invention has the advantage of providing an improved user interface for a code assist function.

A preferred embodiment of the present invention has the advantage of providing a user-configurable set of user preferences for configuring an operation of an improved code assist function.

A preferred embodiment of the present invention has the advantage of providing an improved code assist function supporting multiple computer programming languages.

A preferred embodiment of the present invention has the advantage of providing an improved code assist function supporting multiple syntax and format variations for a single computer programming statement.

A preferred embodiment of the present invention has the advantage of providing an improved code assist function supporting multiple keyword variations for a particular keyword of a computer programming statement.

A preferred embodiment of the present invention has the advantage of providing an improved code assist function supporting optional keywords for a particular computer programming language command or verb.

A preferred embodiment of the present invention has the advantage of providing an improved code assist function supporting computer programming language commands or verbs containing recursive syntax.

A preferred embodiment of the present invention has the advantage of providing an improved code assist function providing a list of commands or verbs, key words, identifier names, and literal names as proposals at a current cursor position in a computer program statement.

A preferred embodiment of the present invention has the advantage of providing an improved code assist function providing a user-selectable choice of either a shorter list or a longer list of proposals.

A preferred embodiment of the present invention has the advantage of providing an improved code assist function providing a user-selectable preference as to a case of a proposal: upper case, lower case, or mixed case.

A preferred embodiment of the present invention has the advantage of providing an improved code assist function providing a user-selectable choice from available formats for a particular command or verb.

A preferred embodiment of the present invention has the advantage of providing an improved code assist function providing a user-selectable choice of either full or abbreviated representations of a keyword.

A preferred embodiment of the present invention has the advantage of providing an improved code assist function displaying a suggested candidate responsive to a determination of declared variables and constants.

A preferred embodiment of the present invention has the advantage of providing an improved code assist function displaying a suggested candidate responsive to a determination of a code segment containing a partial program instruction statement.

BRIEF DESCRIPTION OF THE DRAWINGS

For a more complete understanding of the present invention and the advantages thereof, reference is now made to the Description of the Preferred Embodiment in conjunction with the attached Drawings, in which:

FIG. 1 through FIG. 7 are graphical user interfaces used in a preferred embodiment of the present invention;

DESCRIPTION OF THE PREFERRED EMBODIMENT

Figure 3:
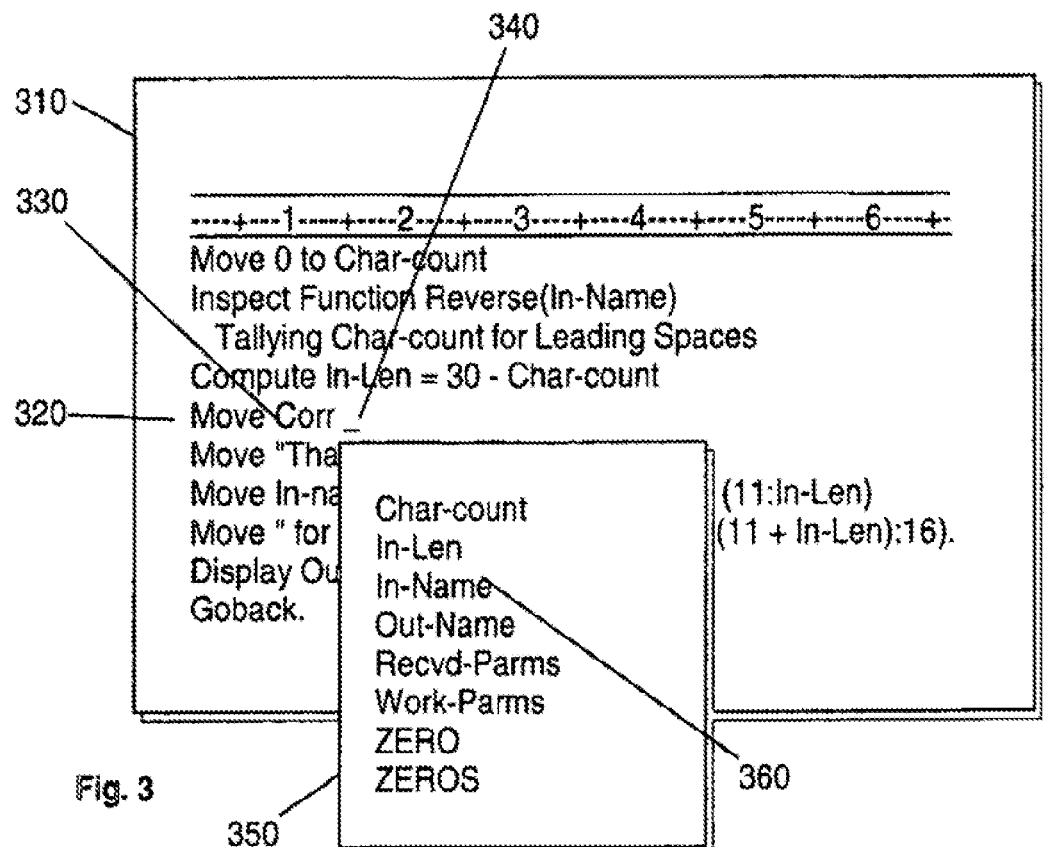

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

FIG. 1 illustrates an editor screen or window 110 displaying a COBOL source code file in which a blank line 120 has been inserted by the user. The user may activate the code assist function by pressing a key or key combination, such as CONTROL-SPACE, which causes the code assist function to display a window 130 containing a list 140 of proposals or proposed candidates to insert at the current cursor position 120. The user may select one of the proposals from the list by clicking a mouse cursor on the proposal to be selected, and responsive to the user's selection of the selected proposal, the selected proposal is inserted at the current cursor position. The user may also scroll the list up and down to find the desired proposal. Alternatively, the user may use keystrokes, such as up arrow, down arrow, tab, return, or enter keys, to scroll, navigate, and select within the list 140.

If the user desires to insert a MOVE statement at the current cursor position 120, then the user may scroll down the list 140 until a MOVE keyword proposal is displayed. The user may then select the MOVE keyword proposal to be inserted which results in the window 210 of FIG. 2 in which the MOVE keyword 220 is inserted in the partial program statement 230, and in which the current cursor position 240 is moved after the inserted keyword. Responsive to the partial program statement 230 now comprising the MOVE keyword 220, the code assist function suggests further proposal candidates 250 for insertion at the now current cursor position 240. Based upon the syntax of a MOVE program statement, the code assist function suggests proposal candidates comprising the keywords CORRESPONDING and CORR which may follow the MOVE keyword, and comprising identifiers or variables declared within the program which may follow the MOVE keyword, but excluding those identifiers which cannot be specified in a MOVE statement. For example, in some COBOL dialects, data items described with the following types of usage cannot be specified in a MOVE statement: INDEX, POINTER, FUNCTION-POINTER, PROCEDURE-POINTER, and OBJECT REFERENCE.

If the user selects the CORR keyword proposal 260 for the next insertion at the current cursor position 240, the window 310 of FIG. 3 results in which the CORR keyword 330 has been inserted at the end of the partial program statement 320 and in which the current cursor position 340 is moved after the inserted keyword 330. Responsive to the partial program statement 320 now comprising the MOVE and CORR keywords, the code assist function suggests further proposal candidates 350 for insertion at the now current cursor position 340. Based upon the syntax of the MOVE program statement, the code assist function suggests proposal candidates comprising identifiers or variables declared within the program which may follow the MOVE statement CORR keyword.

Figure 4:
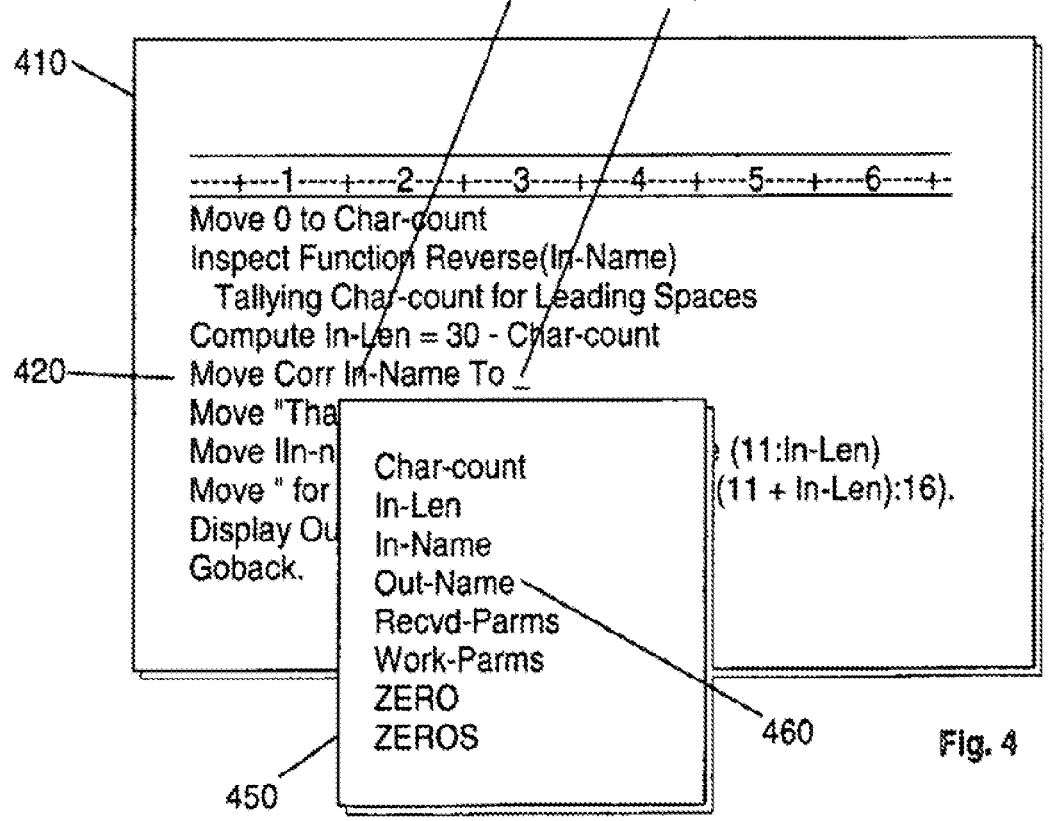

The user may now select one of the literal or variable proposals from 350 such as the In-Name proposal 360 for the next insertion at the current cursor position 340. The window 410 of FIG. 4 results in which the In-Name literal and TO keyword 430 have been inserted at the end of the partial program statement 420 and in which the current cursor position 440 is moved after the inserted literal and keyword 430. Responsive to the partial program statement 420 now comprising the MOVE and CORR keywords followed by the literal In-Name and the TO keyword, the code assist function suggests further proposal candidates 450 for insertion at the now current cursor position 440. Based upon the syntax of the MOVE program statement, the code assist function suggests proposal candidates comprising identifiers or variables declared within the program which may follow the MOVE statement TO keyword.

Figure 5:
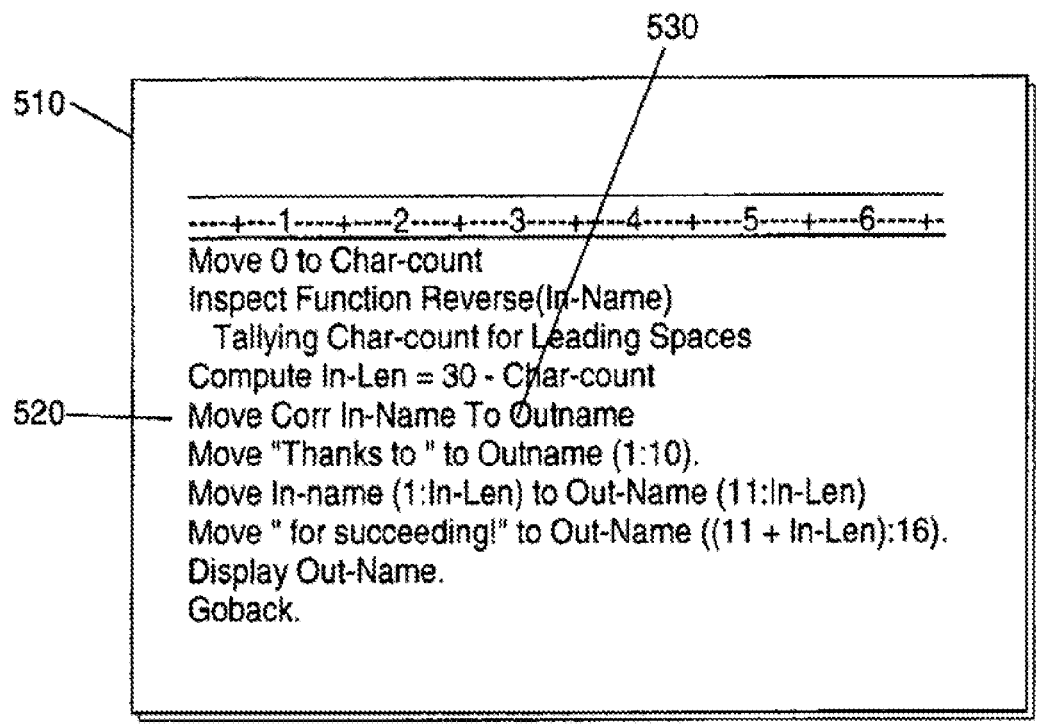

The literal or variable proposal Out-Name 460 from the window 450 may be selected by the user for the next insertion at the current cursor position 440. The window 510 of FIG. 5 results in which the Out-Name literal has been inserted at the end of the program statement 520. This insertion results in a complete program statement 520, and responsive to this complete program statement 520 comprising a complete MOVE program statement, the code assist function does not suggest any further proposal candidates 350 for this complete program statement 520.

Figure 6:
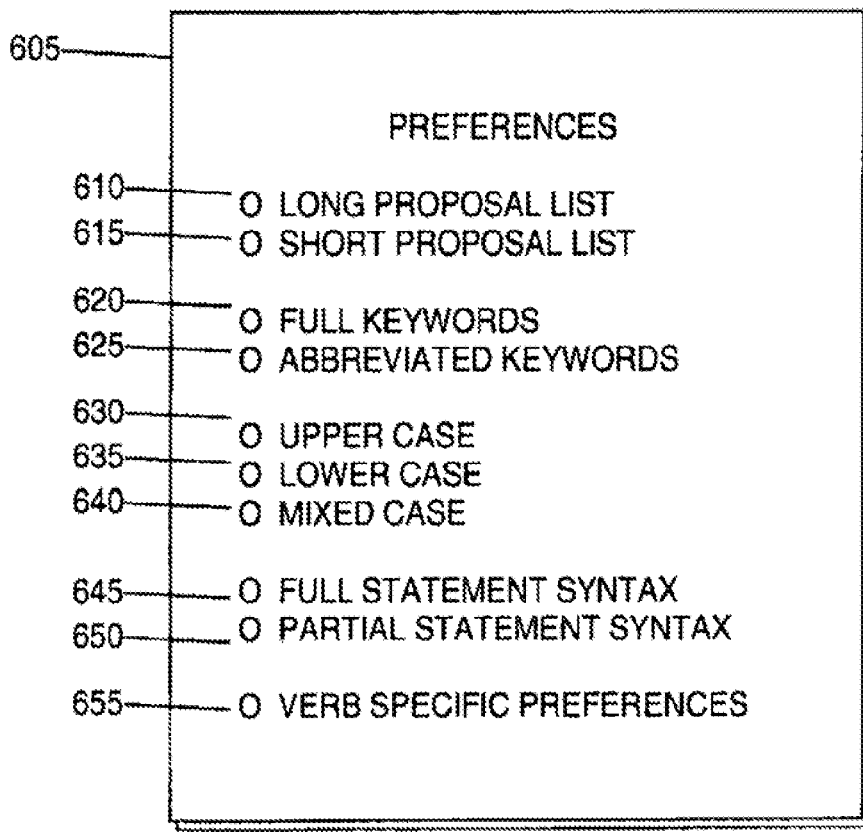
Figure 7:
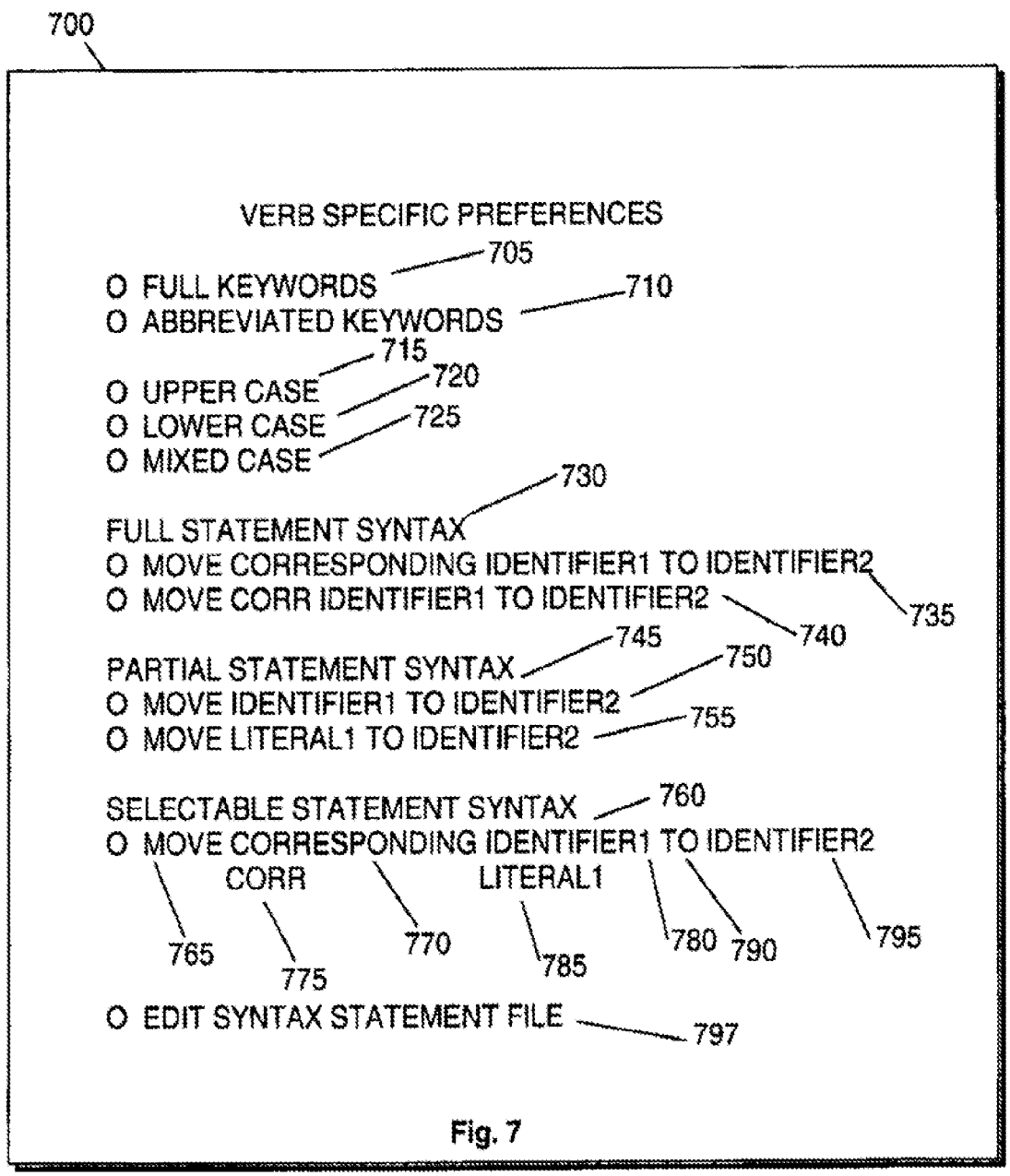

Referring now to FIGS. 6 and 7, graphical user interfaces which may be used to configure the operation of the code assist function of the preferred embodiment are illustrated. Referring first to FIG. 6, window 605 provides a graphical user interface which enables the user to specify user-selectable preferences as to the operation of the code assist function of the preferred embodiment. The user may select checklist item 610 to cause the code assist function to display a longer list of candidates responsive to the parsing of a partial program instruction statement, or alternatively, the user may select checklist item 615 to cause the code assist function to display a shorter list of candidates responsive to the parsing of the partial program instruction statement. For example, the longer list of candidates may comprise all candidates suggested by the code assist function; whereas, the shorter list may comprise categories of candidates such as keywords, identifiers, or literals from which the user may select to display the candidates in the selected category.

As a default behavior of the code assist function, the user may specify a preference as to longer representations displaying full keywords or shorter representations displaying abbreviated keywords in proposal candidates suggested by the code assist function. The user may select checklist item 620 to cause a display of a longer representation of a program instruction keyword candidate responsive to the parsing of a partial program instruction statement, or the user may select checklist item 625 to cause a display of a shorter representation of a program instruction keyword candidate responsive to the parsing of the partial program instruction statement. For example, if the user has selected checklist item 620 indicating a preference for longer full keyword representations, then the code assist function will display in suggested proposal candidates full keywords such as "CORRESPONDING", "IDENTIFICATION", "JUSTIFIED", "PICTURE", "SYNCHRONIZED", and "THROUGH". If the user has selected checklist item 625 indicating a preference for shorter abbreviated keyword representations, then the code assist function will display in suggested proposal candidates shorter abbreviated keywords such as "CORR", "ID", "JUST", "PIC", "SYNC", and "THRU".

The user may also specify a preference as to the case of the suggest proposal candidates. The user may select checklist item 630 to cause proposal candidates to be displayed in a lower-case representation (i.e., "move"), checklist item 635 to cause proposal candidates to be displayed in an upper-case representation (i.e., "MOVE"), or checklist item 640 to cause proposal candidates to be displayed in a mixed-case or leading upper-case representation (i.e., "Move").

As a further default behavior of the code assist function, the user may specify a preference as to displaying a full system syntax representation or a partial syntax representation. The user may select checklist item 645 to cause a display of a full syntax representation of a program instruction verb candidate responsive to the parsing of a partial program instruction statement, or the user may select checklist item 650 to cause a display of a partial syntax representation of a program instruction verb candidate responsive to the parsing of a partial program instruction statement. For example, if the user has selected checklist item 645 indicating a preference for a full syntax representation, then the code assist function will display a MOVE instruction candidate in the full syntax: "MOVE CORRESPONDING IDENTIFIER-1 TO IDENTIFIER-2". If the user has selected checklist item 650 indicating a preference for a partial syntax representation, then the code assist function may display a MOVE instruction candidate in a partial syntax: "MOVE IDENTIFIER-1 TO IDENTIFIER-2".

Although the user may specify user-selected preferences applicable to all candidates proposed by the code assist function, the user may also override these general preferences with verb-specific preferences by selecting checklist item 655 which causes a display of a list of verbs from which the user may select one verb to specify verb-specific preferences. If the user selects one of the verbs, such as "MOVE", to specify verb-specific preferences, then a window 700 of FIG. 7 is displayed. Even though the user may have specified shorter abbreviated keywords as the default behavior of the code assist function, the user may specify a verb-specific preference of full keywords for the selected verb which overrides the general default behavior. For example, if the user has selected checklist item 705 indicating a preference for longer full keyword representations for the MOVE instruction, then the code assist function will display in suggested proposal candidates full keywords such as "MOVE CORRESPONDING" as opposed to the general preference of shorter abbreviated keywords such as "ADD CORR" or "SUBTRACT CORR". Similarly, checklist item 710 allows the user to override a general preference for longer full keywords with a verb-specific preference of shorter abbreviated keywords.

In a similar fashion, the user may use upper-case checklist item 715, lower-case checklist item 720, and mixed-case checklist item 725 to specify a verb-specific preference for the selected verb which overrides the general default behavior specified in window 605.

The Statement Syntax section 730 of the verb-specific preferences window 700 allows the user to select one preferred syntax from a plurality of valid syntax representations. For example, for the MOVE instruction, Statement Syntax section 730 allows the user to select from a full keyword full syntax representation 735 comprising "MOVE CORRESPONDING IDENTIFIER1 TO IDENTIFIER2"; an abbreviated full syntax representation 740 comprising "MOVE CORR IDENTIFIER1 TO IDENTIFIER2", a partial syntax 750 comprising "MOVE IDENTIFIER1 TO IDENTIFIER2", or an alternative partial syntax 755 "MOVE LITERAL1 TO IDENTIFIER2". The preferred syntax selected by the user will be used by the code assist function when it suggests proposal candidates for that particular verb.

Alternatively, to select the syntax preference for the instruction, the user may click on the checklist item Selectable Syntax 760 which allows the user to click on portions of the syntax diagram to specify the syntax preference. For example, the user may click on "MOVE" 765, "CORRESPONDING" 770, "IDENTIFIER1" 780, "TO" 790, and "IDENTIFIER2" 795 to identify and select the following full keyword full syntax representation of the MOVE instruction: "MOVE CORRESPONDING IDENTIFIER1 to IDENTIFIER2". In lieu of selecting "CORRESPONDING" 770, the user may select "CORR" 775 which results in the user identifying and selecting the following abbreviated keyword full syntax representation: "MOVE CORR IDENTIFIER1 TO IDENTIFIER2". If the user clicks on "MOVE" 765, "IDENTIFIER1" 780, "TO" 790, and "IDENTIFIER2" 795, then the partial syntax "MOVE IDENTIFIER1 TO IDENTIFIER2" is identified and selected as the syntax representation of the MOVE instruction. Alternatively, the user may click on "MOVE" 765, "LITERAL1" 785, "TO" 790, and "IDENTIFIER2" 795 to identify and select the following alternative partial syntax representation of the MOVE instruction: "MOVE CORRESPONDING LITERAL1 TO IDENTIFIER2".

In lieu of these graphical user interface techniques, the user may select the checklist item Edit Syntax Statement File 797 to directly edit the syntax statement rules contained in the syntax statement file used by the code assist function parser.

Figure 8:
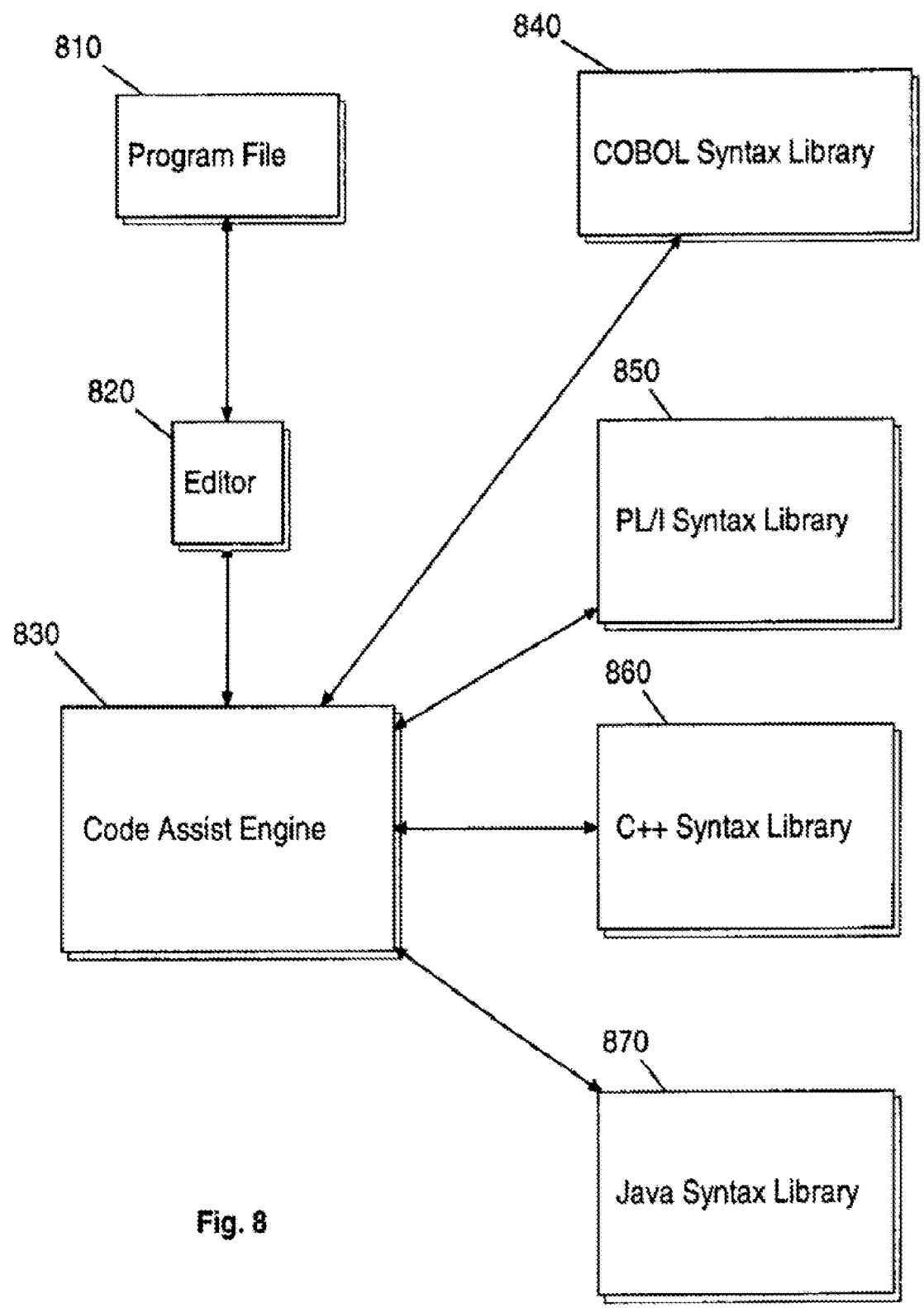
FIG. 8 is a block diagram the preferred embodiment of the present invention.

Referring now to FIG. 8, a block diagram of the preferred embodiment of the present invention is illustrated. A programmer may open a program file 810 with editor 820 to edit program source code contained in the program file 810. If the programmer requests code assist or content assist, it is provided by Code Assist Engine 830 which uses a Syntax Library appropriate for the programming language in which the program of program file 810 is written. If program file 810 is written in COBOL, then the Code Assist Engine 830 uses a COBOL Syntax Library 840 to provide code assist. Alternatively, if the program file 810 is written in another programming language, such as PL/I, C++, or Java for example, then the Code Assist Engine 830 uses either a PL/I Syntax Library 850, C++ Syntax Library 860, or Java Syntax Library 870 to provide code assist. These programming languages are merely exemplary examples as a Syntax Library may be written to support any programming language. The Code Assist Engine 830 may determine which Syntax Library is appropriate to use with program file 810 by analyzing either attributes or content of program file 810. For example, if a file attribute such as a file name extension is "cbl" indicating that program file 810 is a COBOL program file, then the code Assist Engine 830 uses COBOL Syntax Library 840. Alternatively, Code Assist Engine 830 may analyze the content of program file 810 to determine that it contains COBOL program code and that COBOL Syntax Library 840 should be used. In still other embodiments, the Syntax Library used by the Code Assist Engine 830 may be based upon a user-specified preference, a user-specified selection, or a history file.

Figure 9:
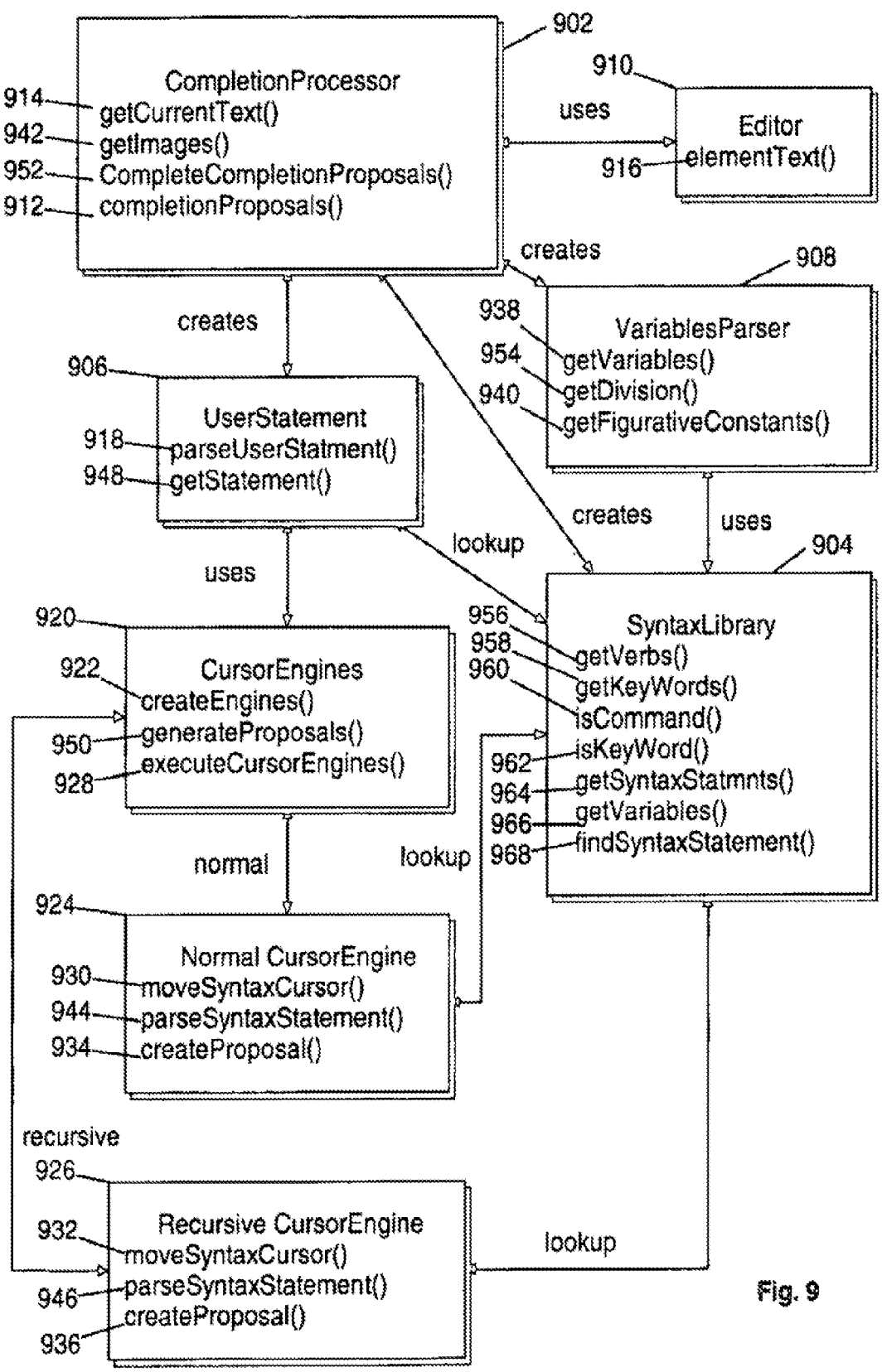
FIG. 9 is a class diagram of the preferred embodiment of the present invention.

Referring now to FIG. 9, a class diagram of the preferred embodiment of the present invention is illustrated. The classes comprise a CompletionProcessor class 902, Editor class 910, VariablesParser class 908, UserStatement class 906, SyntaxLibrary class 904, CursorEngines class 920, Normal CursorEngine class 924, and Recursive CursorEngine class 926.

The CompletionProcessor class 902 manages the overall operation of the code assist function, and comprises methods getCurrentText( ) 914, getImages( ) 942, CompleteCompletionProposals( ) 952, and completionProposals( ) 912. The method getCurrentText( ) 914 calls the editor 910 for the elementText( ) 916 to get the partial statement to be parsed to provide code assist. The methods CompleteCompletionProposals( ) 952, completionProposals( ) 912 and getImages( ) 942 match a type from each proposal of the combined proposal vector to an image and return these images to the CompletionProcessor 902.

The Editor class 910 provides editing functions for the program file being edited, and comprises elementText( ) 916 which provides the partial statement to getCurrentText( ) 914.

The VariablesParser class 908 parses the program to identify variables and functional constants, and comprises methods getVariables( ) 938, getDivision( ) 954, and getFigurativeConstants( ) 940. The method getVariables( ) 938 parses the program to identify variables. The method getDivision( ) 954 gets Syntax Statements from SyntaxLibrary 904 to parse a current division of the program file. The method getFigurativeConstants( ) 940 parses the program to identify and get functional constants.

The UserStatement class 906 parses the partial statement based upon Syntax Statements obtained from the Syntax Library 904, and comprises methods parseUserStatement( ) 918, and getStatement( ) 948. The method parseUserStatement( ) 918 parses the partial statement, and the method getStatement( ) 948 obtains the appropriate Syntax Statements from the Syntax Library 904.

The SyntaxLibrary class 904 stores an array of Syntax Statements describing the syntax of a particular programming language, and comprises methods getVerbs( ) 956, getKeyWords( ) 958, isCommand( ) 960, isKeyWord( ) 962, getSyntaxStatmnts( ) 964, getVariables( ) 966, and findSyntaxStatement( ) 968. The method getVerbs( ) 956 returns the commands supported by the programming language for which the SyntaxLibrary stores the programming language syntax. A command is normally the first keyword of a programming language statement. The method getKeyWords( ) 958 returns the keywords, excluding command keywords, supported by the programming language for which the SyntaxLibrary stores the programming language syntax. The method isCommand( ) 960 tests whether a token is a command. The method isKeyWord( ) 962 tests whether a token is a keyword. The method getSyntaxStatmnts( ) 964 gets the syntax statements as defined in a SyntaxLibrary for a particular programming language. The method getVariables( ) 966 gets the variables defined in the source program as detected by VariablesParser. The method findSyntaxStatement( ) 968 finds syntax statements in the SyntaxLibrary which match a given command.

Within the SyntaxLibrary class 904, language syntax diagrams are converted into syntax statement strings and stored in an array of strings forming a Syntax Statement Library. The first keyword in each syntax statement is the command or verb, and is distinguished from other keywords. When an incomplete programming language statement is presented to the Code Assist Engine 830, it matches the statement command or verb to the command keywords in the syntax statements producing a result comprising those matching syntax statements to be considered for subsequent processing which generates proposals.

Within syntax statements, special characters are used to delimit the syntax statements as follows:

| Character | Significance |
| --- | --- |
| &n, &m | "&n" and "&m" are recursion labels. "&n" labels a start of a recursion within a syntax statement wherein n is a number from 0 to 9. An "&n" is paired with an "&m" which indicates the end of a recursion. The second "&rn" causes a branch back or recursion to the first "&n". |
| [|] | Brackets indicate Or phrases in which a syntax statement requires either the first item located before the vertical bar within the brackets or the second item located after the vertical bar within the brackets. |
| { } | "{" and "}" indicate phrase boundaries wherein once started a phrase must be completed, as opposed to Or phrases which do not have to be completed. |
| $ | "$" indicates a conditional which may be applied to keywords (i.e., $TO), Or phrases (i.e., $[|]), and phrases (i.e., ${ }). |
| &a | "&a" are symbol labels wherein "a" may be either "i", "s", "b", "l", "p", etc. representing identifiers, statements, both, literal, procedure names, etc. |

As stated above, a Syntax Statement Library is an array of syntax statement strings using the above notation. Given a syntax diagram for each format of each statement, the syntax statements may be written by matching the syntax diagram to the syntax statement notation, including recursion phrases. Different Syntax Statement Libraries may represent different programming languages without modifying the Code Assist Engine. Furthermore, different Syntax Statement Libraries may be used to represent the same programming language, such as having a different Syntax Statement Library for each COBOL division, like IDENTIFICATION, PROCEDURE, etc.

For example, the syntax of a COBOL ALTER statement may be represented by and stored in the Syntax Statement Library by the syntax statement:

"ALTER &1 &p TO ${PROCEED TO} &p &r1"

Within this ALTER syntax statement, "ALTER", "TO" and "PROCEED" are keywords. "ALTER" as the first keyword in the syntax statement is considered to be the command or verb. Commands are determined by getting the first unique keyword in each syntax statement. "&1" and "&r1" are a recursive pair indicating the recursion "&1 &p TO ${PROCEED TO} &p &r1". "{" and "}" mark a phrase "PROCEED TO" that once started must be completed. The "$" marks the phrase "{PROCEED TO}" as conditional or optional. "&p" represents a procedure symbol. Note that symbols from the syntax statement match identifiers or variables from the user statement and not keywords; whereas, keywords in the syntax statement match keywords in the user statement.

The processing of the syntax statements of the Syntax Statement Library occurs in two primary stages: moving the cursor, and creating proposals. The first stage of moving the cursor starts with a character string returned from getCurrentText( ). This character string is the partial user statement. The partial user statement is parsed into tokens which are compared one by one against tokens in one or more syntax statements, such as the above mentioned COBOL syntax statement representing the COBOL ALTER command. Tokens are divided into keywords and variables. As long as matching between the user statement tokens and the syntax statement tokens occurs, the cursor is moved to the start of the next token. The cursor moving stage performs the token matching according to the keywords, phrases, and symbols specified in a syntax statement. When all of the tokens from the partial user statement are processed, the cursor moving stage is complete. If necessary, a same portion of a syntax statement (e.g., between "&1" and "&r1") is parsed again to continue matching if a recursion is matched.

The second stage of creating proposals starts with a cursor index left by the first stage of moving the cursor, wherein this cursor index indicates a position of the last matching tokens. The second stage then moves forward from this cursor index position to generate one or more proposals. For example, if the first cursor moving stage had matched the partial user statement against the following ALTER syntax statement through the conditional "$":

"ALTER &1 &p TO ${PROCEED TO} &p &r1"

then the second stage of creating proposals starts with a cursor index pointing to the conditional "$" in the ALTER syntax statement as the first stage has already matched the tokens "ALTER &1 &p TO" between the syntax statement and the partial user statement. The second stage of creating proposals will then generate "PROCEED TO" as a proposal. Since "PROCEED TO" is an optional conditional, the second stage will also generate a proposal without "PROCEED TO" which would be the next token comprising a procedure name.

If the cursor from the first stage is indexing the end of a recursion phrase, such as the "&r1" in the above ALTER syntax statement, then the second stage would generate another proposal comprising a second "&p TO &p", i.e., "procedure-name1 TO procedure-name2". If the cursor from the first stage is indexing the start of an Or phrase, all of the alternative values within the Or phrase would be generated as proposals.

The CursorEngines class 920 creates and controls a CursorEngine for each Syntax Statement, and comprises methods createEngines( ) 922, generateProposals( ) 950, and executeCursorEngines( ) 928. The method createEngines( ) 922 inspects a Syntax Statement and creates an instance of a normal CursorEngine, and if it detects a recursion loop in the Syntax Statement, then it also creates one instance of a recursive CursorEngine for each recursion loop detected in the statement. The method generateProposals( ) 950 requests that each Normal CursorEngine( ) 924 and each recursive CursorEngine( ) 926 created by its CursorEngines 920 to create proposals based upon their prior parsing of the partial statement. The method executeCursorEngines( ) 928 requests that each Normal CursorEngine( ) 924 and each recursive CursorEngine( ) 926 created by its CursorEngines 920 begin cursor movement and parsing of the partial statement.

The Normal CursorEngine class 924 parses a single Syntax Statement, and comprises methods moveSyntaxCursor( ) 930, parseSyntaxStatement( ) 944, and createProposal( ) 934. The methods moveSyntaxCursor( ) 930 and parseSyntaxStatement( ) 944 request that a normal CursorEngine parses its Syntax Statement as driven by the parsing of the partial statement. The method createProposal( ) 934 requests that a Normal CursorEngine( ) 924 create proposals based upon its prior parsing of the partial statement.

The Recursive CursorEngine class 926 parses a single recursion within a single Syntax Statement, and comprises methods moveSyntaxCursor( ) 932, parseSyntaxStatement( ) 946, and createProposal( ) 936. The methods moveSyntaxCursor( ) 932 and parseSyntaxStatement( ) 946 request that a Recursive CursorEngine parses its Syntax Statement as driven by the parsing of the partial statement. The method createProposal( ) 936 requests that a Recursive CursorEngine( ) 924 create proposals based upon its prior parsing of the partial statement.

Figure 10:
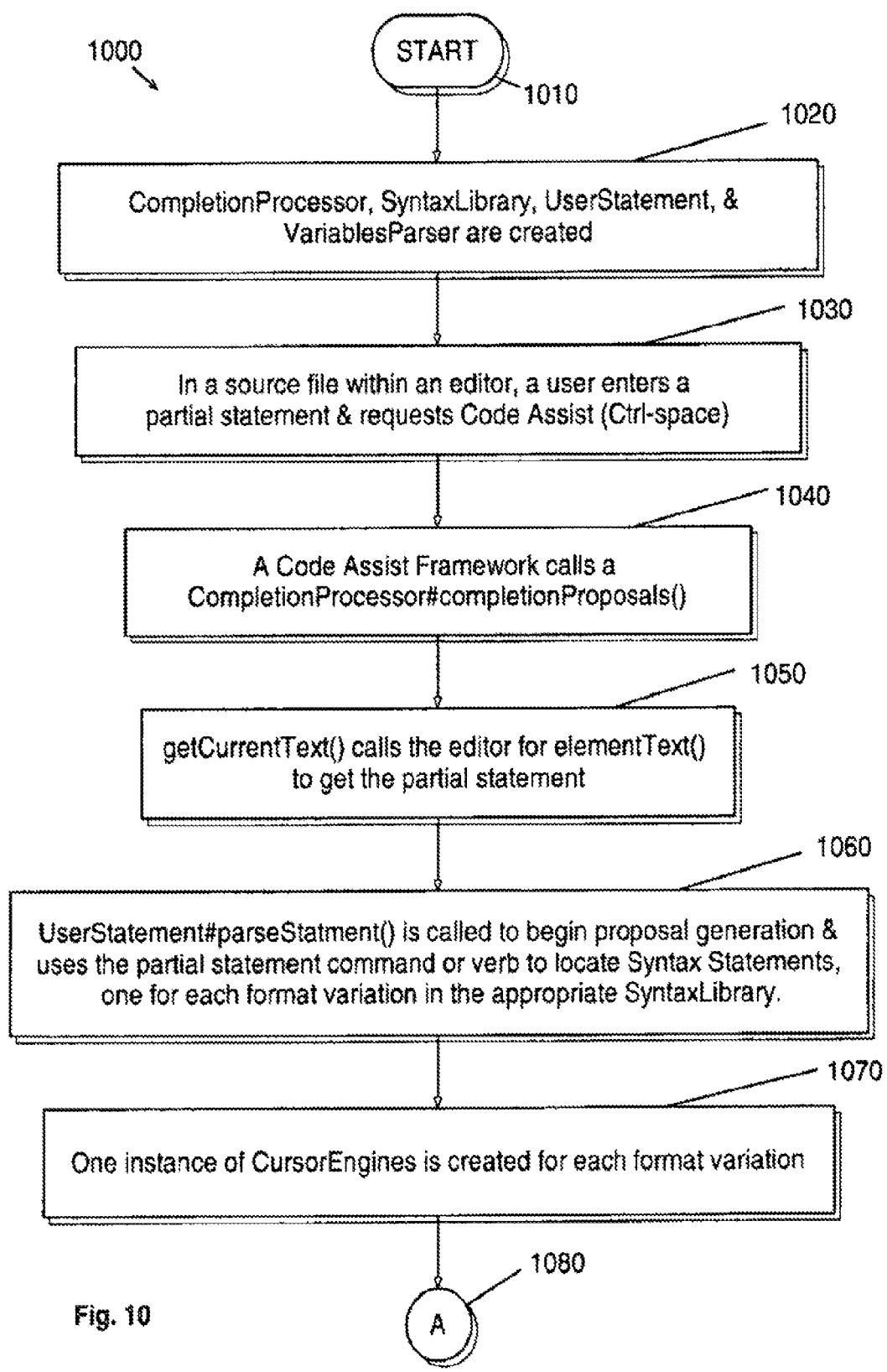
FIG. 10 through FIG. 12 are flowcharts of method steps preferred in carrying out the preferred embodiment of the present invention.
Figure 11:
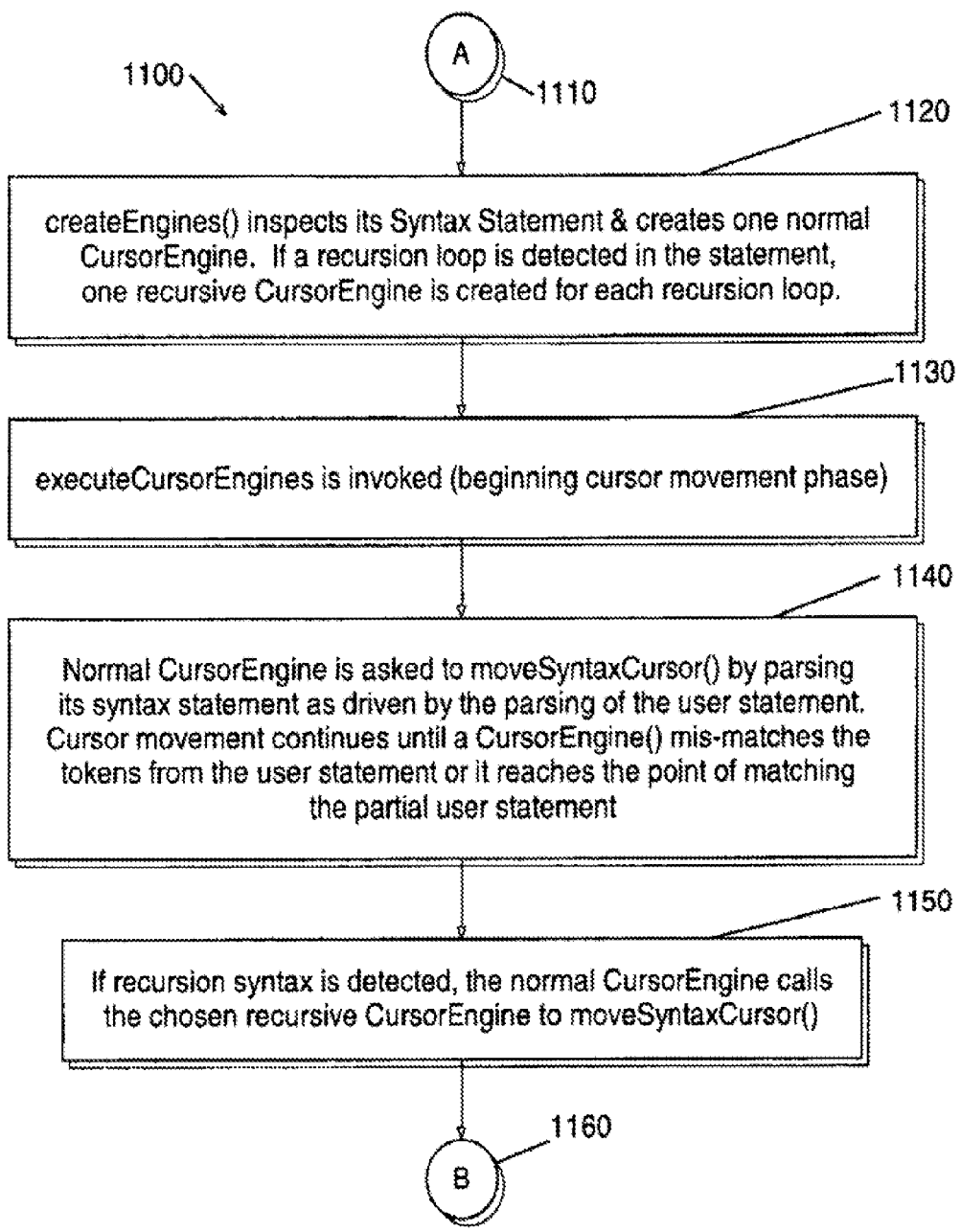
Figure 12:
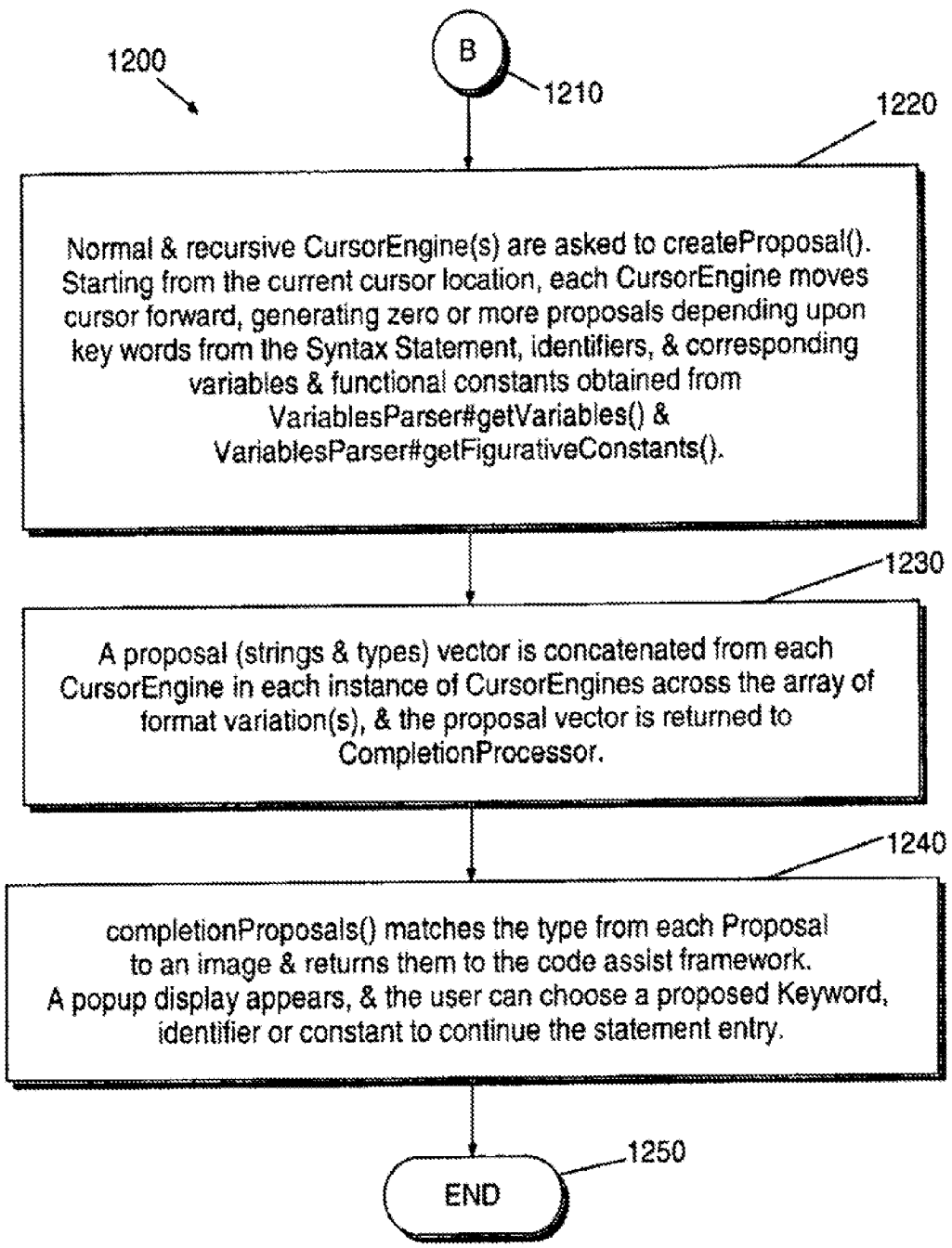

Referring not to FIG. 10 through FIG. 12, the flowcharts 1000, 1100, and 1200 illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Referring first to FIG. 10, after the start 1010 of the process 1000, process block 1020 creates an instance of a CompletionProcessor 902 registered for an appropriate programming language (i.e., cbl file extensions for COBOL), an instance of UserStatement 906, an instance of a VariablesParser 908, and an instance of a SyntaxLibrary 904 for each Division within the program file being edited by editor 910. Process block 1030 monitors for a user requesting the code assist function through the use of a key combination such as Control-Space after entering a partial COBOL statement. Alternatively, the user may activate the code assist function through other input devices and user interfaces well known to those skilled in the art. Responsive to the user's activation of the code assist function, process block 1040 of the CompletionProcessor 902 calls CompletionProcessor#completionProposals( ) 912. Process block 1050 of the CompletionProcessor 902 calls getCurrentText( ) 914 which calls elementText( ) 916 of the editor 910 to get the partial statement upon which the code assist function was activated. The instance of UserStatement#parseStatment( ) 918 is called by process block 1060 of CompletionProcessor 902 to begin the proposal generation. UserStatement#parseStatment( ) 918 parses the partial statement provided by the editor 910 and uses a command (or verb) contained in the partial statement to locate Syntax Statement(s) via getStatement 948, locating one Syntax Statement for each format variation in the appropriate SyntaxLibrary 904 for the current COBOL Division. Process block 1070 creates one instance of CursorEngines 920 for each Syntax Statement format variation. Control then passes to process block 1120 on FIG. 11, illustrated by flowchart connectors A, 1080 on FIG. 10 and 1110 on FIG. 11.

Referring now to FIG. 11, after control passes to process block 1120, process block 1120 of createEngines( ) 922 inspects its Syntax Statement and creates one normal CursorEngine 924 and one recursive CursorEngine 926 for each recursion loop detected in the statement, if any. Process block 1130 of CursorEngines 920 invokes executeCursorEngines 928 to begin a cursor movement phase. During this cursor movement phase, process block 1140 of the normal CursorEngine 924 asks moveSyntaxCursor( ) 930 to parse its syntax statement via parseSyntaxStatement( ) 944 as driven by a parsing of the user-entered partial statement. If a recursive Syntax Statement is detected, then process block 1150 of the normal CursorEngine 924 calls an appropriate recursive CursorEngine 926 which asks moveSyntaxCursor( ) 932 to parse its recursive Syntax Statement via parseSyntaxStatement( ) 946 as driven by a parsing of the user-entered partial statement. Cursor movement within the user-entered partial statement continues until a recursive CursorEngine( ) 926 mis-matches tokens from the user-entered partial statement, or until the recursive CursorEngine( ) 926 reaches a match between its Syntax Statement and the partial user statement, at which point the recursive CursorEngine 926 returns to the normal CursorEngine 924. The normal CursorEngine 924 continues to move its cursor until a mis-match occurs, until more recursion syntax is reached, or until the end of the user-entered partial statement is reached. Control then passes to process block 1220 on FIG. 12, illustrated by flowchart connectors B, 1160 on FIG. 11 and 1210 on FIG. 12.

Referring next to FIG. 12, after control passes to process block 1220, process block 1220 begins the proposal generation phase in which generateProposals( ) 950 of CursorEngines( ) 920 asks Normal CursorEngine( ) 924 and recursive CursorEngine( ) 926 to create proposals based upon their prior parsing via createProposal( ) (934 and 936). To create these proposals, each CursorEngine (924 or 926), starting from the current cursor location, moves the cursor forward generating zero or more proposals. Keywords from the Syntax Statement may added to a proposals vector as proposals. If the current cursor position within the user-entered partial statement is setting on an identifier, then corresponding variables and functional constants are obtained from VariablesParser#getVariables( ) 938 and VariablesParser#getFigurativeConstants( ) 940. These corresponding variables and functional constants may also be added to the proposals vector. Thereafter, process block 1230 concatenates the proposals (strings and types) vectors from each CursorEngine (924 or 926) in each instance of CursorEngines (924 or 926) across an array of format variation(s) to create a single combined proposal vector which is returned to CompletionProcessor 902. Process block 1240 of CompletionProcessor 902 causes completionProposals( ) 912 to match a type from each proposal of the combined proposal vector to an image via getImages( ) 942 and to return these images to the CompletionProcessor 902 which displays a pop-up window (130, 250, 350, or 450) containing the proposal images from which the user can select a proposed Keyword, identifier or constant to continue the entry of the partial statement. After all processing is completed, the process ends at process block 1250.

Figure 13:
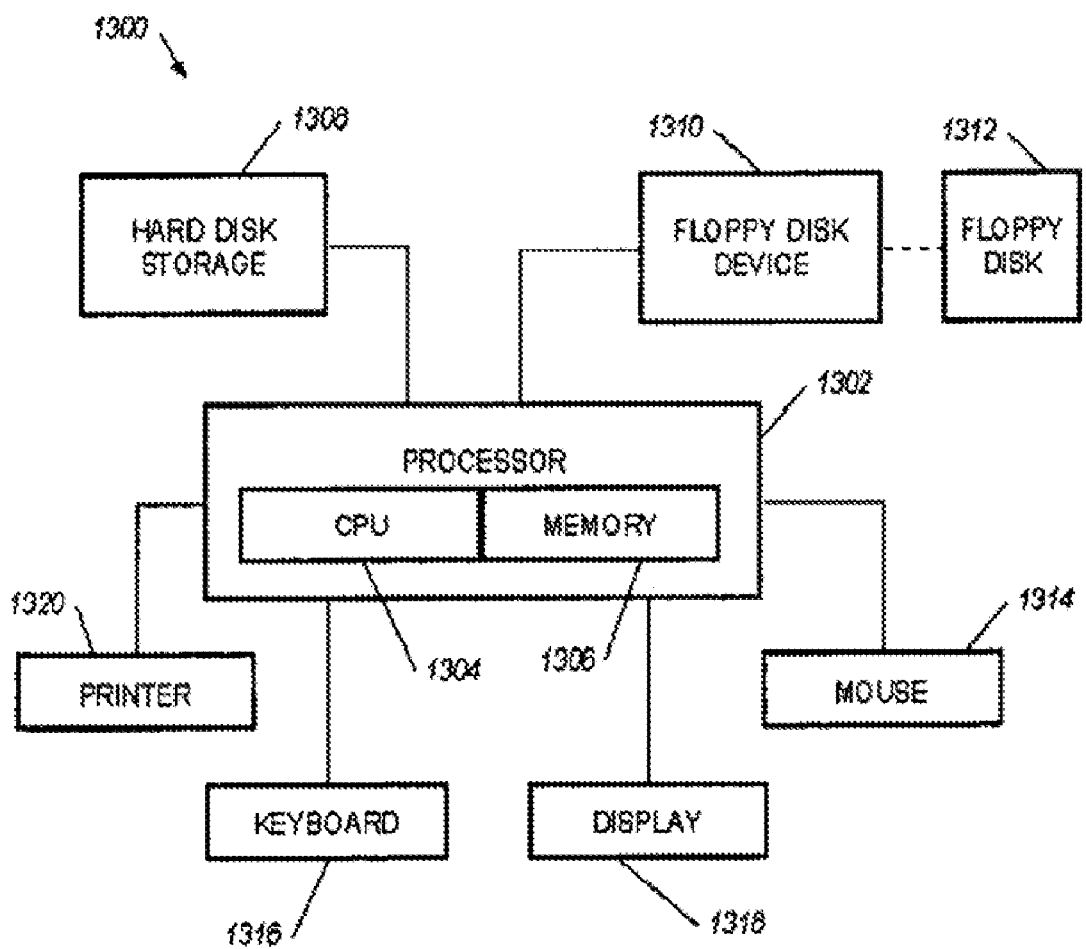
FIG. 13 is a block diagram of a computer system used in performing a method of a preferred embodiment of the present invention, forming part of an apparatus of a preferred embodiment of the present invention, storing a data structure of a preferred embodiment of the present invention, and which may use an article of manufacture comprising a computer-readable storage medium having a computer program embodied in said medium which may cause the computer system to practice a preferred embodiment of the present invention.

With reference now to the figures, and in particular with reference to FIG. 13, there is depicted a pictorial representation of a computer system 1300 which may be utilized to implement a method, system, article of manufacture, data structure, and computer program product of preferred embodiments of the present invention. The block diagram of FIG. 13 illustrates a computer system 1300 used in performing the method of the present invention, forming part of the apparatus of the present invention, and which may use the article of manufacture comprising a computer-readable storage medium having a computer program embodied in said medium which may cause the computer system to practice the present invention. The computer system 1300 includes a processor 1302, which includes a central processing unit (CPU) 1304, and a memory 1306. Additional memory, in the form of a hard disk file storage 1308 and a computer-readable storage device 1310, is connected to the processor 1302. Computer-readable storage device 1310 receives a computer-readable storage medium 1312 having a computer program embodied in said medium which may cause the computer system to implement the present invention in the computer system 1300. The computer system 1300 includes user interface hardware, including a mouse 1314 and a keyboard 1316 for allowing user input to the processor 1302 and a display 1318 for presenting visual data to the user. The computer system may also include a printer 1320.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims. User input may be received from the keyboard, mouse, pen, voice, touch screen, or any other means by which a human can input data to a computer, including through other programs such as application programs, databases, data sets, or files.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

What is claimed is:

1. An article of manufacture for use in a computer system for providing a code assist function which suggests candidates responsive to a parsing of a partial program instruction statement, said article of manufacture comprising a computer-useable storage medium having a computer program embodied in said medium which causes the computer system to execute method steps comprising:

determining a current cursor position in the partial program instruction statement;

parsing the partial program instruction statement before the current cursor position;

generating a list of candidates to be inserted at the current cursor position responsive to the parsing of the partial program instruction statement;

applying a user-selected preference to the list of candidates to generate a first list of suggested candidates, wherein the user-selected preference provides an indication to display the first list of suggested candidates in lieu of a second list of suggested candidates, wherein candidates in the first list of suggested candidates are different from candidates in the second list of suggested candidates, wherein the first list of suggested candidates comprises a longer list of suggested candidates in comparison to the second list of suggested candidates, wherein the first list of suggested candidates comprises longer representations of program instruction verbs in comparison to shorter representations of program instruction verbs in the second list of suggested candidates, and wherein the first list of suggested candidates comprises full syntax representations in comparison to partial syntax representations in the second list of suggested candidates;

displaying the first list of suggested candidates;

allowing a user to select one candidate of the first list of suggested candidates; and inserting at the current cursor position the user-selected suggested candidate.

2. The article of manufacture of claim 1 wherein the user-selected preference comprises displaying a shorter list of suggested candidates in lieu of a longer list of suggested candidates.

3. The article of manufacture of claim 1 wherein the user-selected preference comprises one from the set comprising displaying a lower-case representation of a program instruction candidate responsive to the parsing of a partial program instruction statement, displaying a upper-case syntax representation of a program instruction verb candidate responsive to the parsing of a partial program instruction statement, and displaying a leading upper-case syntax representation of a program instruction verb candidate responsive to the parsing of a partial program instruction statement.

4. A computer system for providing a code assist function which suggests candidates responsive to a parsing of a partial program instruction statement, said computer system comprising:

a processor;

a current cursor position in the partial program instruction statement;

a parser for parsing the partial program instruction statement before the current cursor position;

a list of candidates to be inserted at the current cursor position responsive to the parsing of the partial program instruction statement;

a user-selected preference applied to the list of candidates to generate a first list of suggested candidates, wherein the user-selected preference provides an indication to display the first list of suggested candidates in lieu of a second list of suggested candidates, wherein candidates in the first list of suggested candidates are different from candidates in the second list of suggested candidates, wherein the first list of suggested candidates comprises a longer list of suggested candidates in comparison to the second list of suggested candidates, wherein the first list of suggested candidates comprises longer representations of program instruction verbs in comparison to shorter representations of program instruction verbs in the second list of suggested candidates, and wherein the first list of suggested candidates comprises full syntax representations in comparison to partial syntax representations in the second list of suggested candidates;

a display of the first list of suggested candidates;

a selection by a user of one of the first list of suggested candidates; and the user-selected suggested candidate inserted at the current cursor position.

5. The computer system of claim 4 wherein the user-selected preference comprises displaying a shorter list of suggested candidates in lieu of a longer list of suggested candidates.

6. The computer system of claim 4 wherein the user-selected preference comprises one from the set comprising displaying a lower-case representation of a program instruction candidate responsive to the parsing of a partial program instruction statement, displaying a upper-case syntax representation of a program instruction verb candidate responsive to the parsing of a partial program instruction statement, and displaying a leading upper-case syntax representation of a program instruction verb candidate responsive to the parsing of a partial program instruction statement.

* * * * *